(12) United States Patent
Godlewski et al.

(10) Patent No.: US 12,584,572 B2
(45) Date of Patent: Mar. 24, 2026

(54) V-CLAMP WITH BAND LOCK

(71) Applicant: Oetiker Schweiz AG, Horgen (CH)

(72) Inventors: Tomasz Godlewski, Legnickie (PL);
Adam Serek, Legnickie (PL)

(73) Assignee: Oetiker Schweiz AH, Horgen (CH)

( * ) Notice: Subject to any disclaimer, the term of this
patent is extended or adjusted under 35
U.S.C. 154(b) by 0 days.

(21) Appl. No.: 18/864,980

(22) PCT Filed: May 16, 2023

(86) PCT No.: PCT/EP2023/063133
§ 371 (c)(1),
(2) Date: Nov. 12, 2024

(87) PCT Pub. No.: WO2023/222699
PCT Pub. Date: Nov. 23, 2023

(65) Prior Publication Data
US 2025/0314338 A1      Oct. 9, 2025

(30) Foreign Application Priority Data

May 17, 2022    (DE) .......................... 102022112393.6

(51) Int. Cl.
*F16L 23/08*          (2006.01)
(52) U.S. Cl.
CPC ................................... *F16L 23/08* (2013.01)

(58) Field of Classification Search
CPC ......... F16L 23/08; F16L 23/10; F16L 23/003;
F16L 23/006; F16L 17/04; F16L 21/065
See application file for complete search history.

(56) References Cited

U.S. PATENT DOCUMENTS

| | | | |
|---|---|---|---|
| 6,464,268 B1 * | 10/2002 | Hough ..................... | F16L 23/08 |
| | | | 285/367 |
| 7,392,569 B2 * | 7/2008 | Sharkey ................ | F16L 3/1025 |
| | | | 248/74.4 |
| 9,151,422 B2 * | 10/2015 | Kayacik .................. | F16L 23/08 |

* cited by examiner

*Primary Examiner* — Aaron M Dunwoody
(74) *Attorney, Agent, or Firm* — David L. Nocilly; Bond
Schoeneck & King, PLLC

(57) ABSTRACT

A screw-type V-clamp, to be fastened around an object. The
clamp has a clamping band 10 having first and second band
parts 11, 12, a connector 30 attached to first end regions of
the first and second band parts 11, 12 for tightening the
clamping band 10 about the object, and a band lock 20
formed at second end regions of the first and second band
parts 11, 12 for removably attaching the first band part 11 to
the second band part 12. The band lock 20 has a hook
member 22 in the second band part 12, and an aperture 21
in the first band part 11 to receive said hook member 22
when the second end regions of the first and second band
parts 11, 12 circumferentially overlap each other in a locked
configuration. The tip end portion 22*b* of the hook member
22 protrudes radially inwards to become circumferentially
overlapped by the second end region of the first band part 11.

13 Claims, 3 Drawing Sheets

V-CLAMP WITH BAND LOCK

BACKGROUND OF THE INVENTION

Field of the Invention

The present invention relates to a clamp to be fastened around an object of substantially circular cross-section, and more particularly to a screw-type clamp having a V-shaped cross-section used for coupling circular flanges formed at mutually facing ends of two pipes to be interconnected.

Description of the Related Art

An example of such a V-clamp is described in WO 2018/010821 A1. This type of clamp comprises at least one inner segment of generally V-shape cross-section adapted to surround said pipe flanges, a clamping band surrounding said at least one segment, loops provided at both ends of the clamping band, a pair of trunnions surrounded by said loops, and a threaded bolt extending through said trunnions, wherein said at least one segment of generally V-shape cross-section includes two inclined surfaces configured to interact with said flanges such that a radial force exercised by said clamping band is at least partially transformed into an axial force pressing said flanges against each other.

Screwing the threaded bolt allows to pull the two ends of the clamping band towards each other when tightening the clamp around the object to be fastened, such as a hose or a pipe. In practice, the hose or pipe is often installed within a car (or other type of machine) leaving only small assembling space and generally in a way which makes it difficult or impossible to slip the clamp as a closed (but not yet tightened) ring over the pipe or hose. Therefore, the clamp needs to be opened to insert the pipe or hose through the clamp opening between the two free band ends.

While screw-type V-clamps as described in WO 2018/010821 A1 or DE 10 2016 111 117 A1 can be opened by unscrewing the threaded bolt so that it disengages from one of the trunnions, this sort of clamp opening is cumbersome and time consuming. The bolt head has to be reached by a screwdriver and a relatively high number of turning operations is needed to loosen the bolt from the threaded trunnion. Hence, there is the need to provide a quicker possibility for opening the clamp at the assembling stage.

A known solution to this problem are so-called band locks or quick locks. As disclosed, for example, in U.S. Pat. No. 4,521,940 A or U.S. Pat. No. 5,299,344 A, a screw-type clamp may be provided with a clamping band which is separable into two band parts. While the first ends of each band part are provided with the loops surrounding the pair of trunnions for engagement with the threaded bolt, the second end regions of each band part are provided with a band lock for quickly attaching the second ends of the two band parts to each other when assembling the clamp around the object to be fastened. The band lock comprises a hook member provided at the first band part to be engaged into an aperture provided at the second band part. The hook member has a tongue like portion which projects radially outwards to be received in the window-like aperture formed in the second band part.

However, the screw-type clamp shown in U.S. Pat. No. 4,521,940 A or U.S. Pat. No. 5,299,344 A is no V-clamp so that there is still no quick lock solution for V-clamps. Furthermore, the band locking engagement of the prior art quick lock has shown insufficient reliability in overtightening stress tests. It turned out that the tongue like portion can be deformed when the circumferential pulling force from the second band part gets too large. The hook member may then escape from the aperture and the clamp gets destroyed.

DE 26 19 179 A1 describes a flat clamping band whose first and second ends are provided with apertures for inserting hook elements provided at both ends of a band part of a band tightening means. After the clamping band is provided to surround the object to be clamped, the hook elements of the band tightening means have to be inserted into the corresponding apertures at the first and second ends of the clamping band. Thereafter, the clamp can be tightened by use of a tightening screw. The clamping band itself is entirely flat and has no band lock. Simultaneous engagement of the hooks of the band tightening means at two ends into the flat clamping band has turned out to be cumbersome in actual use of this prior art clamp.

BRIEF SUMMARY OF THE INVENTION

The present invention addresses the above-described problems and provides a clamp with improved band lock reliability as defined in the appended patent claims.

Similar to the prior art, the band lock of the present invention has first and second band parts provided with a hook member and an aperture at respective second end regions. However, the tongue-like tip end of the hook member does not project radially outwards as in the prior art but radially inwards.

This means that, when closing the band lock by assembling the two band parts, the second band part provided with the hook member is positioned radially outwards from the first band part provided with the aperture so that the tongue-like tip of the hook member protrudes radially inwards through the aperture of the first band part. Thereby, the second end region of the first band part gets sandwiched between the hook member and the remaining portion of the second end region of the second band part. In other words, the hook member is radially locked by the first band part and cannot be deformed radially outwards. This improvement of the reliability of the band lock has been verified in tests. Even under high tightening stress, the tensile force of the first band part acts in the circumferential direction and hence in parallel to the tip end of the hook member.

The improvement becomes particularly relevant when the band lock of the present invention is applied to a V-clamp. As explained above, such V-clamps typically have one or more inner segments of generally V-shaped cross-section to be arranged radially between the clamping band and the object to be fastened. In a locked configuration of the band lock, the hook member of the second band part gets sandwiched between the at least one inner segment and the second end region of the first band part. Thereby, the hook member is radially confined from both sides. During stress tests, the tongue-like tip portion gets squeezed between the V-shaped inner segment and the first band part. This radial confinement prevents the tongue from bending and escaping the window-like aperture of the band lock. Apart from a V-shape, other cross-sectional forms of the inner segment, such as a H-shape or the like, are also possible. The present invention is applicable to such other shapes equally well since the above-explained sandwiching advantage applies as well.

Preferably, the hook member comprises a bent base portion which extends radially inwards by some inclination angle smaller than 90° (preferably between 10° and 70°, most preferably between 20° and) 40° and a tip end portion which extends generally in the circumferential direction.

While the tip end portion extends in parallel to the second end region of the first band part, the amount by which the base portion projects in the radial direction corresponds to the band thickness of the first band part at the second end region. All this supports a smooth and reliable hook insertion into the aperture of the first band part when the band lock is to be closed. Moreover, it allows for re-opening the band lock without getting stuck.

Preferably, the hook member is formed as a generally rectangular tongue punched out, for example, at three sides from the band material of the second band part and remaining at its fourth side connected with the second end region of the second band part. Likewise, the aperture may be formed as a generally rectangular window punched out at all four sides from the band material of the first band part. This allows to manufacture the band lock from a flat band material quickly and at relatively low cost.

Other hook forms are also possible without leaving benefit of the present invention. For example, the tongue might be non-rectangular and/or offset from the center position in the width direction. Also, two or more tongue-like members (and correspondingly two or more windows) may be provided instead of a single tongue.

The hook member may be deformed so as to have a bent base portion which extends radially inwards and a tip end portion which extends generally in the circumferential direction. After the clamp has been fastened, the amount by which the base portion extends in the radial direction will correspond to the band thickness of the first band part at the second end region.

The invention may be applied to a screw-type clamp wherein a threaded bolt extending through first and second trunnions provided in first and second band loops formed at first end regions of the first and second band part. Instead of having trunnions, some flat support for the bolt and a nut are also know in the art and the present invention may be used equally well for those connecting means. Moreover, still other means for tightening the clamp about the object to be fastened, are possible, for example a deformable ear or a toothlock, and the invention is equally applicable to such tightening means.

BRIEF DESCRIPTION OF THE SEVERAL VIEWS OF THE DRAWING(S)

Embodiments of the invention will be described below in greater detail with reference to the drawings, in which.

DETAILED DESCRIPTION OF THE INVENTION

In the present specification, the terms "radial", "axial" and "circumferential" refer to an overall geometrical form of the clamp which, in its closed state, is generally a ring having a certain radius and circumference. The clamp is designed for embracing a pipe or hose which extends substantially in the axial direction.

Figure 1:
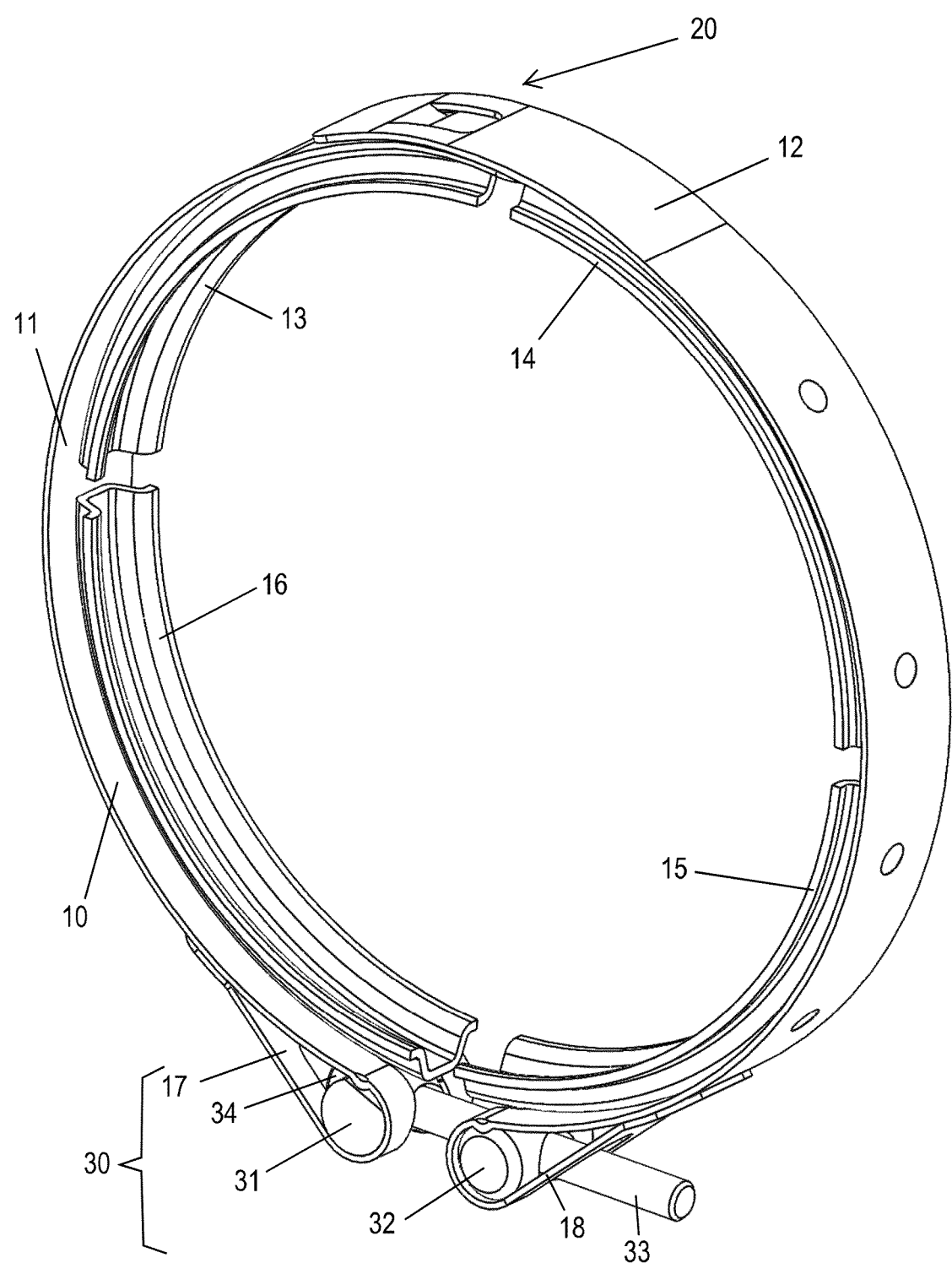
FIG. 1 is a perspective view of a V-clamp according to an embodiment of the present invention.

As shown in FIG. 1, the clamp comprises an outer clamping band 10 which is composed of a first band part 11 and a second band part 12. The first end regions of the first and second band parts 11, 12 are connected by a screw-type connecting or tightening means 30. The second end regions of the first and second band parts 11, 12 are connected by a band lock 20.

The first end regions of the first and second band parts 11, 12 are both looped back to form first and second loops 17, 18 which are adapted to form axial spaces for receiving first and second trunnions 31, 32. The first trunnion 31 has an unthreaded through-hole, and the second trunnion 32 has a threaded through-hole. A threaded bolt 33 extends circumferentially through the through-hole of the first trunnion 31 into the threaded through-hole of the second trunnion 32. By turning the head 34 of the threaded bolt 33 about its longitudinal axis, the connecting means 30 can pull the first and second loops 17, 18 towards each other in order to tighten the clamping band 10 around the object to be fastened (not shown). The connecting means 30 may be released again by turning the bolt head 34 in the opposite turning direction.

The present clamp further comprises four inner profile segments 13-16 of generally V-shape cross-section and arranged circumferentially next to each other. The clamping band 10 surrounds said segments 13-16, and the segments 13-16 are adapted to surround pipe flanges (not shown) of the object to be fastened. Each segment 13-16 includes two inclined surfaces configured to interact with said flanges such that a radial force exercised by the outer clamping band 10 is at least partially transformed into an axial force pressing said flanges against each other.

Second end regions of the first and second band parts 11, 12, which are positioned circumferentially opposite to the first end regions, are provided with the band lock 20 which will be described in greater detail below with reference to FIGS. 2-5.

Figure 2:
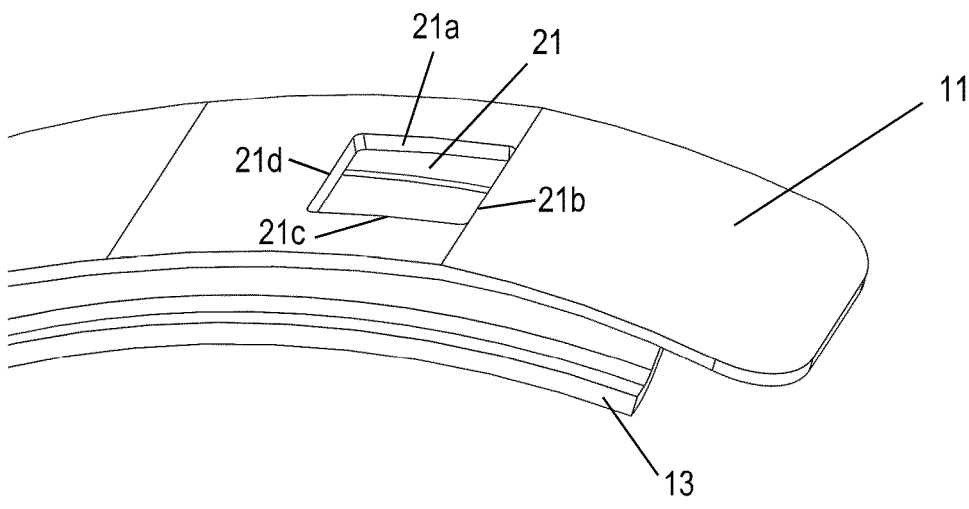
FIG. 2 is a perspective view of the second end portion of the first band part in an unconnected state.

FIG. 2 shows the second end region of the first band part 11 positioned radially above the inner segment 13. The second end region has a window-like aperture 21 positioned centrally in the band width direction. In the shown embodiment, the aperture 21 is formed as a rectangular window obtained by punching out band material at four side edges 21a-21d. Other geometrical forms and arrangements of the aperture 21 are possible and within the scope of the present invention, as long as the aperture 21 is technically adapted to receive the hook member 22 in locking engagement to form a secure band lock 20.

Figure 3A:
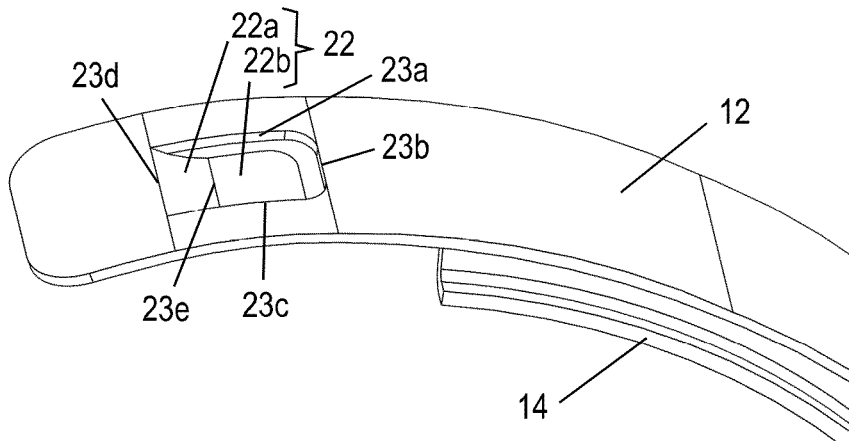
FIG. 3a is a perspective view of the second end portion of the second band part in an unconnected state from above.
Figure 3B:
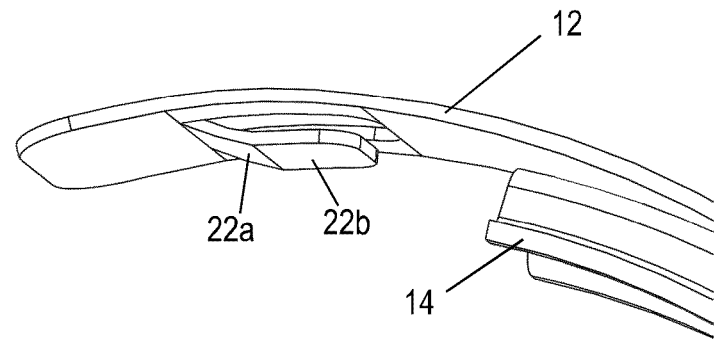
FIG. 3b is a perspective view of the second end portion of the second band part in an unconnected state from below.

FIGS. 3A and 3B show the second end region of the second band part 12 in a view in which a part of it is positioned radially above another inner segment 14. The second end region has a tongue-like hook member 22 positioned centrally in the band width direction. In the shown embodiment, the hook member 22 is formed as a rectangular lug obtained by first punching out band material at three side edges 23a-23c and then bending the rectangular lug twice-first radially inwards about the fourth side edge 23d as a first bending axis and then again back about a second bending axis 23e positioned at a certain distance away from the fourth side edge 23d towards the tip end of the lug. Thereby, the hook member 22 comprises a bent base portion 22a which extends radially inwards by an inclination angle of about 30° to the circumferential direction and a tip end portion 22b which extends generally in the circumferential direction of the clamping band 10. The amount by which the base portion 22a projects in the radial direction is controlled by the distance between the first and second bending axes 23d, 23e and corresponds to the band thickness of the first band part 11 at the second end region.

Other geometrical forms and arrangements of the hook member 22 are possible and within the scope of the present invention, as long as the hook member 22 is technically adapted to engage into the aperture 21 in locking engagement to form a secure band lock 20.

Figure 4:
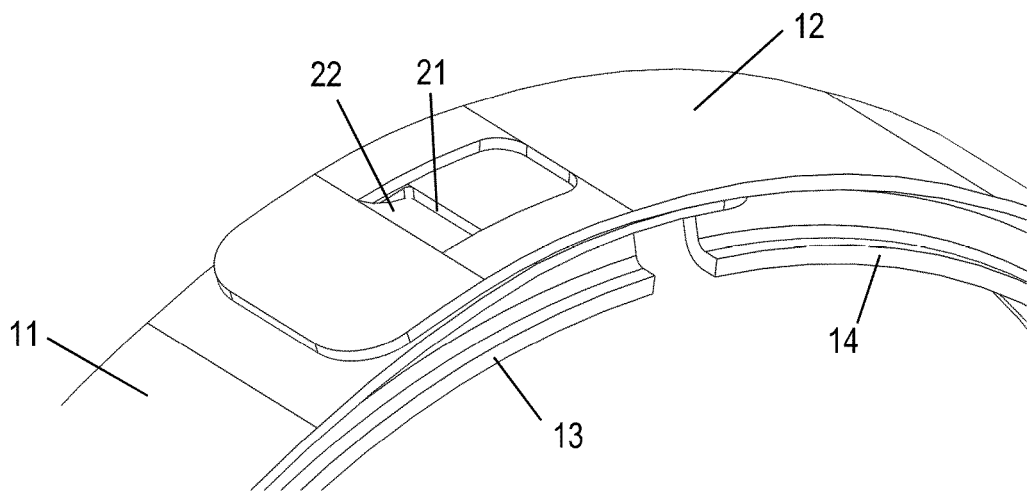
FIG. 4 is a detailed perspective view of the band lock in a connected state in accordance with the embodiment of the present invention.
Figure 5:
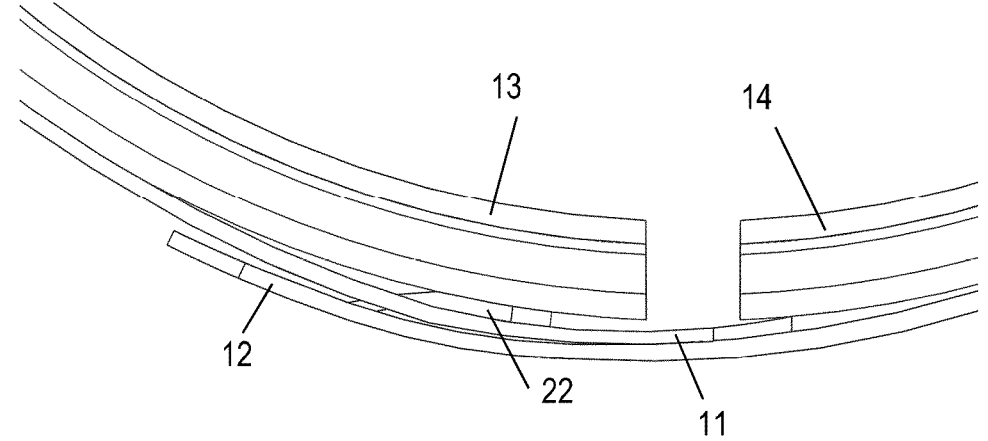
FIG. 5 is a cross-sectional view of the band lock detail shown in FIG. 4.

FIGS. 4 and 5 show a detail of the present clamp when the band lock 20 is in its locked state. The second end region of the second band part 12 is positioned radially outside so as to overlap the second end region of the first band part 11. When the hook portion 22 comes to lie above the aperture 21, the tip end portion 22b protrudes radially into the aperture 21. By pulling the second end regions of the first and second band parts 11, 12 apart from each other, the tip end portion 22b can then be locked beneath the second end region of the first band part 11. This locking state is shown in FIGS. 4 and 5.

The hook member 22 is sandwiched between the inner segment 13 and the second end region of the first band part 12. Due to the compression force acting on the tip end portion 22b from both sides in the radial direction, the hook member 22 will not disengage from the band lock 20 even when applying high tensile stress on the clamping band 10 in the circumferential direction. This effect has been proven in tests.

In summary, the present invention provides a clamp, preferably a screw-type V-clamp, to be fastened around an object. The clamp comprises a clamping band 10 having first and second band parts 11, 12, connecting means 30 attached to first end regions of the first and second band parts 11, 12 and suitable for tightening the clamping band 10 about the object to be fastened, and a band lock 20 formed at second end regions of the first and second band parts 11, 12 and suitable for removably attaching the first band part 11 to the second band part 12. The band lock 20 comprises a hook member 22 formed in the second band part 12, and an aperture 21 formed in the first band part 11 which is adapted to receive said hook member 22 when the second end regions of the first and second band parts 11, 12 circumferentially overlap each other in a locked configuration of the band lock 20. The tip end portion 22b of the hook member 22 protrudes radially inwards so as to become circumferentially overlapped by the second end region of the first band part 11. Thereby, the band lock 20 does not become disengaged even under high tensile forces acting in the circumferential direction of the clamping band 10.

LIST OF REFERENCE NUMBERS

10 clamping band
11 first band part
12 second band part
13-16 V-shaped inner segments
17 first loop
18 second loop
20 band lock
21 aperture/window
21a-d side edges of aperture
22 hook member/tongue
22a bent base portion
22b tip end portion
23a-c cut-out side edges of hook member

23d non cut-out side edge of hook member/first bending axis
23e second bending axis
30 connecting means
31 first trunnion (unthreaded through-hole)
32 second trunnion (threaded through-hole)
33 threaded bolt
34 bolt head

The invention claimed is:

1. A clamp to be fastened around an object, comprising:
a clamping band (10) having first and second band parts (11, 12),
connecting means (30) attached to first end regions of the first and second band parts (11, 12) and suitable for tightening the clamping band (10) about the object to be fastened,
at least one inner segment (13-16) arranged radially between the clamping band (10) and the object to be fastened, and
a band lock (20) formed at second end regions of the first and second band parts (11, 12) and suitable for removably attaching the first band part (11) to the second band part (12),
wherein the band lock (20) comprises a hook member (22) formed in the second band part (12), and an aperture (21) formed in the first band part (11) which is adapted to receive said hook member (22) when the second end regions of the first and second band parts (11, 12) circumferentially overlap each other in a locked configuration of the band lock (20),
wherein the hook member (22) protrudes radially inwards.

2. The clamp of claim 1 wherein, in a locked configuration of the band lock (20), the second end region of the first band part (11) is sandwiched between the hook member (22) and the remaining portion of the second end region of the second band part (12).

3. The clamp of claim 1, wherein the at least one inner segment (13-16) has a generally V-shaped or H-shaped cross-section adapted to surround two pipe flanges of the object to be fastened.

4. The clamp of claim 1 wherein, in a locked configuration of the band lock (20), the hook member (22) of the second band part (12) is sandwiched between the at least one inner segment (13-16) and the second end region of the first band part (11).

5. The clamp of claim 1, wherein the hook member (22) comprises a bent base portion (22a) which extends radially inwards and a tip end portion (22b) which extends generally in the circumferential direction.

6. The clamp of claim 5, wherein the amount by which the base portion (22a) projects in the radial direction corresponds, at least in an assembled condition of the clamp, to the band thickness of the first band part (11) at the second end region.

7. The clamp of claim 5, wherein the tip end portion (22b) of the hook member (22) extends in parallel to the second end region of the first band part (11).

8. The clamp of claim 5, wherein the base portion (22a) extends radially inwards at an inclination angle of 10°-70° with respect to the circumferential direction.

9. The clamp of claim 1, wherein the hook member (22) is formed as a tongue punched out from the band material of the second band part (12) and having a side (23d) connected with the second end region of the second band part (12), wherein the shape of the tongue is a rectangle.

10. The clamp of claim 1, wherein the hook member (22) points circumferentially backwards from the second end region towards the first end region of the second band part (12).

11. The clamp of claim 1, wherein the aperture (21) is formed as a window punched out at its circumferential sides (21*a-d*) from the band material of the first band part (11), wherein the shape of the window is a rectangle.

12. The clamp of claim 1, wherein the first and second band parts (11, 12) are each formed as integral band members whose second end regions circumferentially overlap each other in a locked configuration of the band lock (20).

13. A clamp to be fastened around an object, comprising:
a clamping band (10) having first and second band parts (11, 12),
connecting means (30) attached to first end regions of the first and second band parts (11, 12) and suitable for tightening the clamping band (10) about the object to be fastened, and
a band lock (20) formed at second end regions of the first and second band parts (11, 12) and suitable for removably attaching the first band part (11) to the second band part (12), wherein the band lock (20) comprises a hook member (22) formed in the second band part (12), and an aperture (21) formed in the first band part (11) which is adapted to receive said hook member (22) when the second end regions of the first and second band parts (11, 12) circumferentially overlap each other in a locked configuration of the band lock (20), wherein the hook member (22) protrudes radially inwards, and wherein the connecting means (30) comprises a first trunnion (31) provided in a first band loop (17) formed at the first end region of the first band part (11), a second trunnion (32) provided in a second band loop (18) formed at the first end region of the second band part (12), and a threaded bolt (33) extending through the first and second trunnions (31, 32) and engaging with an inner thread in one of the trunnions (31, 32) for pulling the first and second band loops (17, 18) closer to each other when tightening the clamping band (10) about the object to be fastened.

* * * * *